US012566645B2

(12) United States Patent
Mahadev et al.

(10) Patent No.: US 12,566,645 B2
(45) Date of Patent: Mar. 3, 2026

(54) PREDICTED-TEMPERATURE-BASED VIRTUAL MACHINE MANAGEMENT SYSTEM

(71) Applicant: Dell Products L.P., Round Rock, TX (US)

(72) Inventors: Pavithra Mahadev, Bangalore (IN); Faizal Saidalavi Nabeesa, Bangalore (IN); Abhishek Gupta, Rohini (IN); Rushyendra Velamuri, Bangalore (IN); Komal Pal, Amritsar (IN)

(73) Assignee: Dell Products L.P., Round Rock, TX (US)

( * ) Notice: Subject to any disclaimer, the term of this patent is extended or adjusted under 35 U.S.C. 154(b) by 494 days.

(21) Appl. No.: 18/113,331

(22) Filed: Feb. 23, 2023

(65) Prior Publication Data

US 2024/0289149 A1     Aug. 29, 2024

(51) Int. Cl.
*G06F 9/50* (2006.01)
*G06F 9/455* (2018.01)

(52) U.S. Cl.
CPC ........ *G06F 9/5094* (2013.01); *G06F 9/45558* (2013.01); *G06F 2009/4557* (2013.01); *G06F 2009/45591* (2013.01)

(58) Field of Classification Search
CPC .............. G06F 9/45558; G06F 9/5094; G06F 2009/4557; G06F 2009/45591
See application file for complete search history.

(56) References Cited

U.S. PATENT DOCUMENTS

| | | | | |
|---|---|---|---|---|
| 7,031,870 | B2 * | 4/2006 | Sharma | G05D 23/1931 |
| | | | | 702/130 |
| 8,676,397 | B2 * | 3/2014 | Longobardi | H05K 7/20836 |
| | | | | 700/277 |
| 9,830,410 | B2 * | 11/2017 | VanGilder | G01K 7/427 |
| 10,956,208 | B2 * | 3/2021 | Ahmed | G06F 3/0647 |
| 11,442,833 | B2 * | 9/2022 | Luo | G11C 11/40626 |
| 2014/0031956 | A1 * | 1/2014 | Slessman | G06F 9/5094 |
| | | | | 700/28 |
| 2020/0073726 | A1 * | 3/2020 | Lee | G06N 3/084 |
| 2021/0034436 | A1 * | 2/2021 | Tian | G06F 9/45558 |

* cited by examiner

*Primary Examiner* — Jacob D Dascomb
(74) *Attorney, Agent, or Firm* — Joseph Mencher

(57) ABSTRACT

A networked system includes a virtual machine management system coupled to physical systems. The virtual machine management system receives current resource utilization information and current temperature information from each of the physical systems, and uses the current resource utilization information and the current temperature information to predict a predicted temperature associated with at least one of the physical systems. The virtual machine management system then determines whether a first predicted temperature associated with a first physical system is below a temperature threshold. In response to determining that the first predicted temperature is below the threshold temperature, the virtual machine management system provides virtual machine(s) on the first physical system. In response to determining that the first predicted temperature is not below the threshold temperature, the virtual machine management system migrates virtual machine(s) being provided on the first physical system to a second physical system.

20 Claims, 13 Drawing Sheets

302

COMMUNICATION
SUBSYSTEM
310

PHYSICAL SYSTEM
OPERATION
REPORTING ENGINE
306

MEMORY
SUBSYSTEM
304

PROCESSING
SUBSYSTEM
302

TEMPERATURE
SENSOR
SUBSYSTEM
308

PHYSICAL SYSTEM 300

402

COMMUNICATION SYSTEM 408

VIRTUAL MACHINE MANAGEMENT ENGINE 404

VIRTUAL MACHINE MANAGEMENT DATABASE 406

VIRTUAL MACHINE MANAGEMENT SYSTEM 400

302

COMMUNICATION SUBSYSTEM 310

602

PHYSICAL SYSTEM OPERATION REPORTING ENGINE 306

600

MEMORY SUBSYSTEM 304

PROCESSING SUBSYSTEM 302

TEMPERATURE SENSOR SUBSYSTEM 308

PHYSICAL SYSTEM 300

302

PHYSICAL SYSTEM 300

COMMUNICATION SUBSYSTEM 310

702

PHYSICAL SYSTEM OPERATION REPORTING ENGINE 306

700

MEMORY SUBSYSTEM 304

PROCESSING SUBSYSTEM 302

TEMPERATURE SENSOR SUBSYSTEM 308

700

402

COMMUNICATION
SYSTEM
408

702

VIRTUAL MACHINE
MANAGEMENT
ENGINE
404

704

VIRTUAL MACHINE
MANAGEMENT
DATABASE
406

VIRTUAL MACHINE MANAGEMENT SYSTEM 400

PREDICTED-TEMPERATURE-BASED VIRTUAL MACHINE MANAGEMENT SYSTEM

BACKGROUND

The present disclosure relates generally to information handling systems, and more particularly to managing virtual machines provided on information handling systems based on predicted temperatures associated with those information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, other computing devices, and/or other "physical systems" known in the art, are often used to provide virtual machines. For example, such physical systems may be provided in racks that may be included in one or more datacenters, and may be configured as part of a "cloud infrastructure" to provide one or more virtual machines that are configured to run workloads for users. As will be appreciated by one of skill in the art in possession of the present disclosure, the provisioning of virtual machines by physical systems utilizes physical resources in those physical systems, and results in the generation of heat in those physical systems, which can raise some issues.

For example, as the temperature of a physical system increases, physical resources in that physical system may require throttling in order to prevent them from exceeding physical resource temperature thresholds. As will be appreciated by one of skill in the art in possession of the present disclosure, the throttling of physical resources in physical systems can limit the ability of those physical systems to provide virtual machines, which in turns limits the options for a virtual machine management system to allocate new virtual machines to those physical systems, and can present issues with regard to efficiently allocating virtual machines in a rack or datacenter. Furthermore, in some cases such throttling of physical resource in physical systems may require the migration of virtual machines to other physical systems, and when combined with the virtual machine allocation issues discussed above may result in repeated/frequent virtual machine migration operations that can waste time and resources. Further still, the generation of relatively high temperatures in physical systems can reduce the lifespan of the physical system and/or its physical resources, reduce performance of the physical system and its virtual machines, increase the power requirements associated with the physical system (e.g., due to the power needed to cool the physical system), introduce environmental harms, degrade virtual machines service levels related to reliability, availability, throughput, and/or other service levels, and/or introduce other issues that would be apparent to one of skill in the art in possession of the present disclosure.

Accordingly, it would be desirable to provide a virtual machine management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a virtual machine management engine that is configured to: receive current resource utilization information from each of a plurality of physical systems; receive current temperature information from each of the plurality of physical systems; predict, using the current resource utilization information and the current temperature information, a predicted temperature associated with at least one of the plurality of physical systems; determine whether a first predicted temperature associated with a first physical system that is included in the plurality of physical systems is below a temperature threshold and: in response to determining that the first predicted temperature is below the threshold temperature, provide at least one virtual machine on the first physical system; and in response to determining that the first predicted temperature is not below the threshold temperature, migrate at least one virtual machine that is being provided on the first physical system to a second physical system that is included in the plurality of physical systems.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
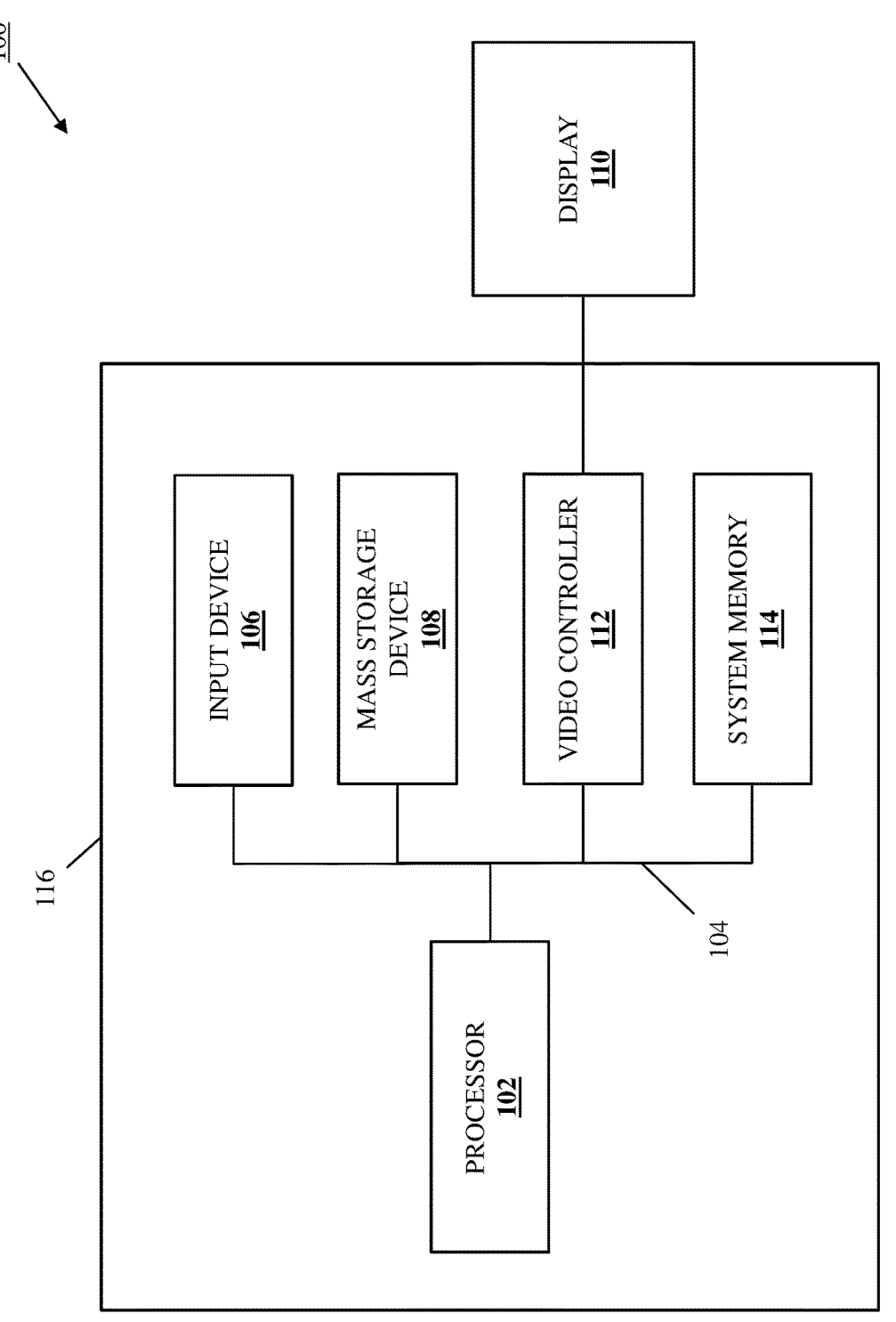
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
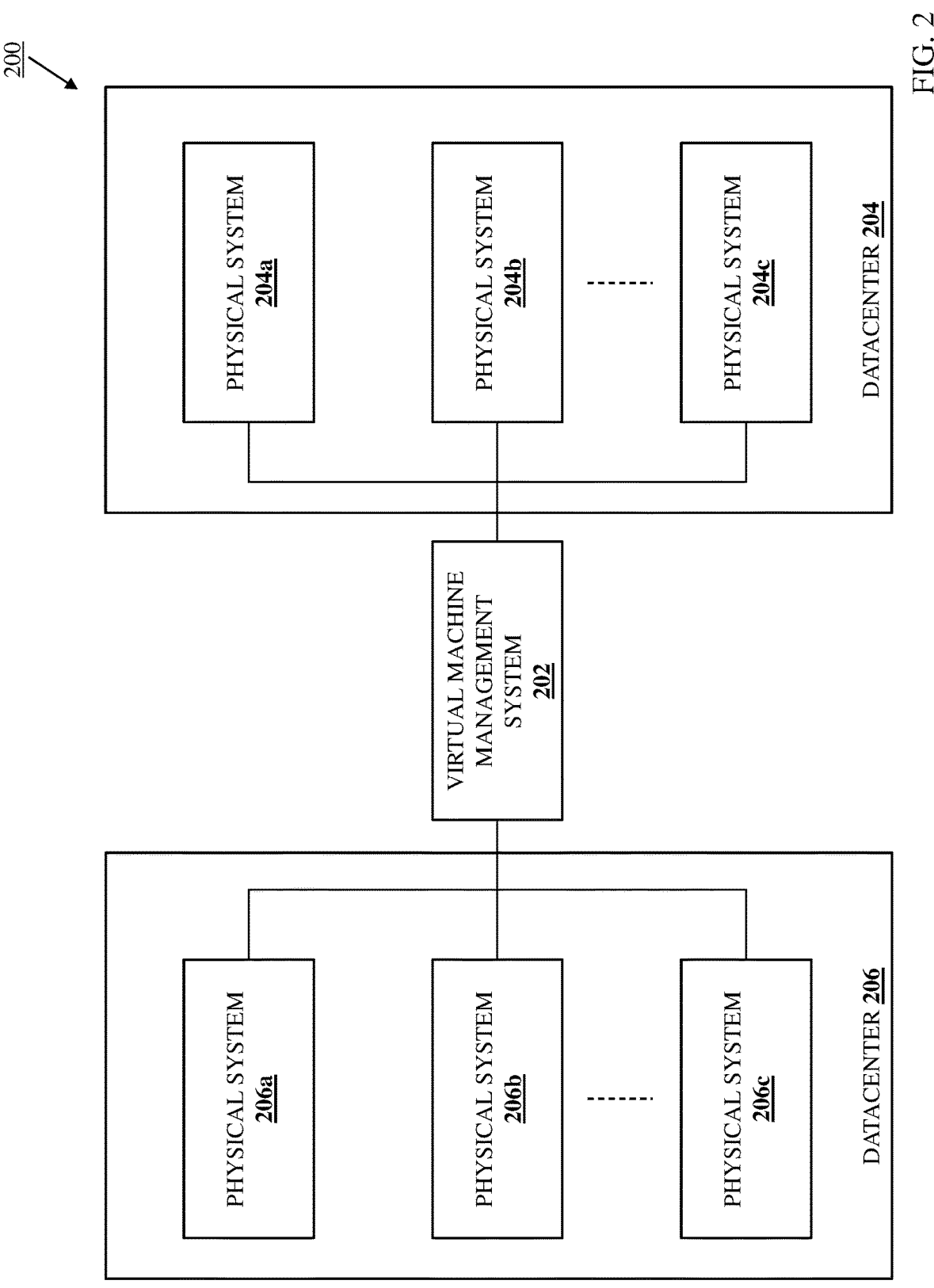
FIG. 2 is a schematic view illustrating an embodiment of a networked system that may include the predicted-temperature-based virtual machine management system of the present disclosure.

Referring now to FIG. 2, an embodiment of a networked system 200 is illustrated that may include the predicted-temperature-based virtual machine management system of the present disclosure. In the illustrated embodiment, the networked system 200 includes a virtual machine management system 202. In an embodiment, the virtual machine management system 202 may be provided by the IHS 100 discussed above with reference to FIG. 1, and/or may include some or all of the components of the IHS 100, and in specific examples may be provided by one or more server devices. However, while illustrated and discussed as being provided by one or more server devices, one of skill in the art in possession of the present disclosure will recognize that virtual machine management systems provided in the networked system 200 may include any devices that may be configured to operate similarly as the virtual machine management system 202 discussed below.

In the illustrated embodiment, the networked system 200 also includes a datacenter 204. A plurality of physical systems 204a, 204b, and up to 204c are included in the datacenter 204 and coupled to the virtual machine management system 202 directly, via a network (e.g., a Local Area Network (LAN), the Internet, combinations thereof, and/or other networks that would be apparent to one of skill in the art in possession of the present disclosure), and/or in a variety of other manners known in the art. In an embodiment, any or each of the physical systems 204a-204c may be provided by the IHS 100 discussed above with reference to FIG. 1, and/or may include some or all of the components of the IHS 100, and in specific examples may be provided by server devices. However, while illustrated and discussed as being provided by server devices, one of skill in the art in possession of the present disclosure will recognize that physical systems provided in the networked system 200 may include any devices that may be configured to operate similarly as the physical systems 204a-204c discussed below. As discussed below, subsets of the physical systems 204a-204c may be housed in a rack in the datacenter 204, with the datacenter 204 including any number of racks.

In the illustrated embodiment, the networked system 200 also includes a datacenter 206. A plurality of physical systems 206a, 206b, and up to 206c are included in the datacenter 206 and coupled to the virtual machine management system 202 directly, via a network (e.g., a Local Area Network (LAN), the Internet, combinations thereof, and/or other networks that would be apparent to one of skill in the art in possession of the present disclosure), and/or in a variety of other manners known in the art. In an embodiment, any or each of the physical systems 206a-206c may be provided by the IHS 100 discussed above with reference to FIG. 1, and/or may include some or all of the components of the IHS 100, and in specific examples may be provided by server devices. However, while illustrated and discussed as being provided by server devices, one of skill in the art in possession of the present disclosure will recognize that physical systems provided in the networked system 200 may include any devices that may be configured to operate similarly as the physical systems 206a-206c discussed below. As discussed below, subsets of the physical systems 206a-206c may be provided in a rack in the datacenter 206, with the datacenter 206 including any number of racks.

As will be appreciated by one of skill in the art in possession of the present disclosure, while only two datacenters are illustrated and described in the specific examples provided herein, the virtual machine management system 202 may be coupled to other datacenters including other physical systems while remaining within the scope of the present disclosure as well. Furthermore, while a specific networked system 200 has been illustrated and described, one of skill in the art in possession of the present disclosure will recognize that the predicted-temperature-based virtual machine management system of the present disclosure may be provided using a variety of components and component configurations while remaining within the scope of the present disclosure as well.

Figure 3:
FIG. 3 is a schematic view illustrating an embodiment of a physical system that may be included in the networked system of FIG. 2.

Referring now to FIG. 3, an embodiment of a physical system 300 is illustrated that may provide any or each of the physical systems 204a-204c or 206a-206c discussed above with reference to FIG. 2. As such, the physical system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the physical system 300 discussed below may be provided by other devices that are configured to operate similarly as the physical system 300 discussed below. In the illustrated embodiment, the physical system 300 includes a chassis 302 that houses the components of the physical system 300, only some of which are illustrated and discussed below. For example, the chassis 302 may house a processing subsystem 302 (e.g., the processor 102 discussed above with reference to FIG. 1) and a memory subsystem 304 (e.g., the memory 114 discussed above with reference to FIG. 1) that is coupled to the processing system 302 and that may include (or be provided with) instructions that, when executed by the processing system 302, cause the processing system 302 to perform the functionality of the physical systems 300 discussed below.

For example, the memory system 304 may be provided with instructions that, when executed by the processing system 304, cause the processing system 304 to provide virtual machine engines that are configured to provide the virtual machines that perform the functionality of the virtual machine engines, virtual machines, and/or physical systems discussed below. Furthermore, the memory system 304 may be provided with instructions that, when executed by the processing system 304, cause the processing system 304 to provide a physical system operation reporting engine 306 that is configured to perform the functionality of the physical system operation reporting engines and/or physical systems discussed below. However, while specific functionality enabled by the processing system 302 and memory system 304 has been described, one of skill in the art in possession of the present disclosure will appreciate how other functionality may be enabled by the processing system 302, memory system 304, and/or physical system 300 while remaining within the scope of the present disclosure as well.

The chassis 302 may also house a temperature sensor subsystem 308 that is illustrated as being coupled to the processing system 302 and the memory system 304 (as well as the physical system operation reporting engine 306), but one of skill in the art in possession of the present disclosure will appreciate how the temperature sensor subsystem 308 may be configured to detect and report any temperature experienced by or associated with the physical system 300 while remaining within the scope of the present disclosure as well. As illustrated and discussed in further detail below, the physical system operation reporting engine 306 may be coupled to each of the processing system 302, the memory system 304, and the temperature sensor subsystem 308 to enable the resource utilization information retrieval, temperature information retrieval, and/or other information retrieval that one of skill in the art in possession of the present disclosure would recognize as providing for the functionality described below.

The chassis 302 may also house a communication system 308 that is coupled to the physical system operation reporting engine 306 (e.g., via a coupling between the communication system 308 and the processing system 302) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific physical system 300 has been illustrated and described, one of skill in the art in possession of the present disclosure will recognize that physical systems (or other devices operating according to the teachings of the present disclosure in a manner similar to that described below for the physical system 300) may include a variety of components and/or component configurations for providing conventional physical system functionality, as well as the functionality discussed below, while remaining within the scope of the present disclosure as well.

Figure 4:
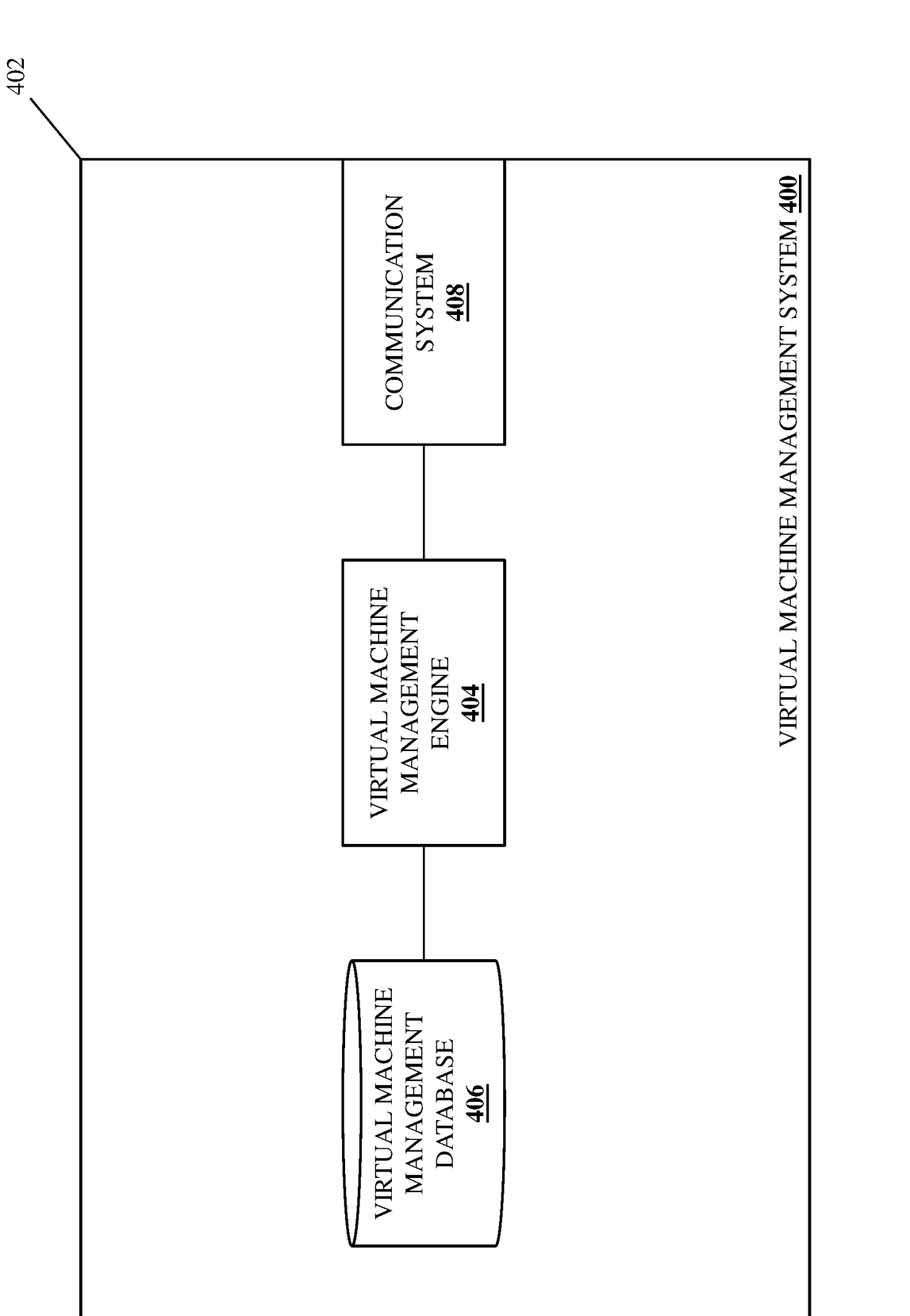
FIG. 4 is a schematic view illustrating an embodiment of a virtual machine management system that may be included in the networked system of FIG. 2 and that may provide the predicted-temperature-based virtual machine management system of the present disclosure.

Referring now to FIG. 4, an embodiment of a virtual machine management system 400 is illustrated that may provide the virtual machine management system 202 discussed above with reference to FIG. 2. As such, the virtual machine management system 400 may be provided by the IHS 100 discussed above with reference to FIG. 1 and/or may include some or all of the components of the IHS 100, and in specific examples may be provided by one or more server devices. Furthermore, while illustrated and discussed as being provided by one or more server devices, one of skill in the art in possession of the present disclosure will recognize that the functionality of the virtual machine management system 400 discussed below may be provided by other devices that are configured to operate similarly as the virtual machine management system 400 discussed below. In the illustrated embodiment, the virtual machine management system 400 includes a chassis 302 that houses the components of the virtual machine management system 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a virtual machine management engine 404 that is configured to perform the functionality of the virtual machine management engines and/or virtual machine management systems discussed below.

The chassis 402 may also house a storage system (not illustrated, but which may include the storage 108 discussed above with reference to FIG. 1) that is coupled to the virtual machine management engine 404 (e.g., via a coupling between the storage system and the processing system) and that includes a virtual machine management database 406 that is configured to store any of the information utilized by the virtual machine management engine 404 discussed below. The chassis 402 may also house a communication system 408 that is coupled to the virtual machine management engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific virtual machine management system 400 has been illustrated and described, one of skill in the art in possession of the present disclosure will recognize that virtual machine management systems (or other devices operating according to the teachings of the present disclosure in a manner similar to that described below for the virtual machine management system 400) may include a variety of components and/or component configurations for providing conventional virtual machine management functionality, as well as the functionality discussed below, while remaining within the scope of the present disclosure as well.

Figure 5:
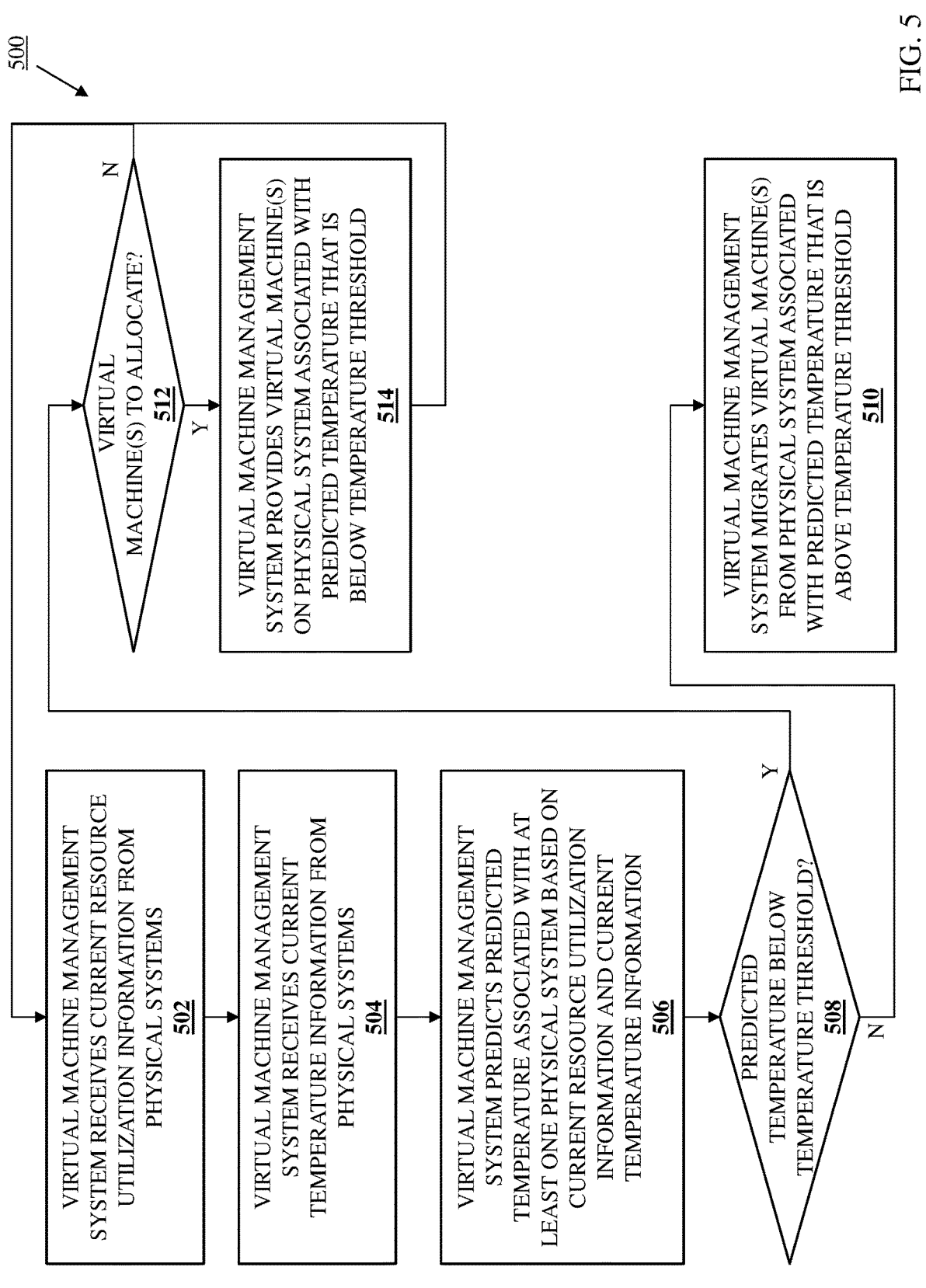
FIG. 5 is a flow chart illustrating an embodiment of a method for managing virtual machines based on predicted temperatures.

Referring now to FIG. 5, an embodiment of a method 500 for managing virtual machines based on predicted temperatures is illustrated. As discussed below, the systems and methods of the present disclosure provide for management of virtual machines provided on (or to-be provided on) physical systems by predicting whether temperatures that those physical systems will experience based on their current temperatures and resource utilization will exceed temperature thresholds. For example, a networked system may include a virtual machine management system coupled to physical systems. The virtual machine management system receives current resource utilization information and current temperature information from each of the physical systems, and uses the current resource utilization information and the current temperature information to predict a predicted temperature associated with at least one of the physical systems. The virtual machine management system then determines whether a first predicted temperature associated with a first physical system is below a temperature threshold. In response to determining that the first predicted temperature is below the threshold temperature, the virtual machine management system provides virtual machine(s) on the first physical system. In response to determining that the first predicted temperature is not below the threshold temperature, the virtual machine management system migrates virtual machine(s) being provided on the first physical system to a second physical system. As such, virtual machines may be provided on or moved between physical systems proactively to ensure those physical systems remain below temperature thresholds, thus reducing or eliminating the inefficient provisioning of virtual machines that may subsequently require virtual machine migration (e.g., due to temperature issues in the physical system on which those virtual machines were provisioned).

The method 500 begins at block 502 where a virtual machine management system receives current resource utilization information from physical systems. As will be appreciated by one of skill in the art in possession of the present disclosure and as discussed in further detail below, virtual machines may be provisioned on the physical systems 204a-204c and 206a-206c, with each of those virtual machines "hosting" or otherwise performing one or more workloads (and with the number of workloads performed by any particular virtual machine changing over time in some embodiments). As such, the resources of the processing subsystems 302 and memory subsystems 304 in each physical system 204a-204c and 206a-206c may be utilized to provide its virtual machines and perform the workloads hosted by those virtual machines, and that utilization may be monitored and reported by each of those physical systems 204a-204c and 206a-206c.

Figure 6A:
FIG. 6A is a schematic view illustrating an embodiment of the physical system of FIG. 3 operating during the method of FIG. 5.
Figure 6B:
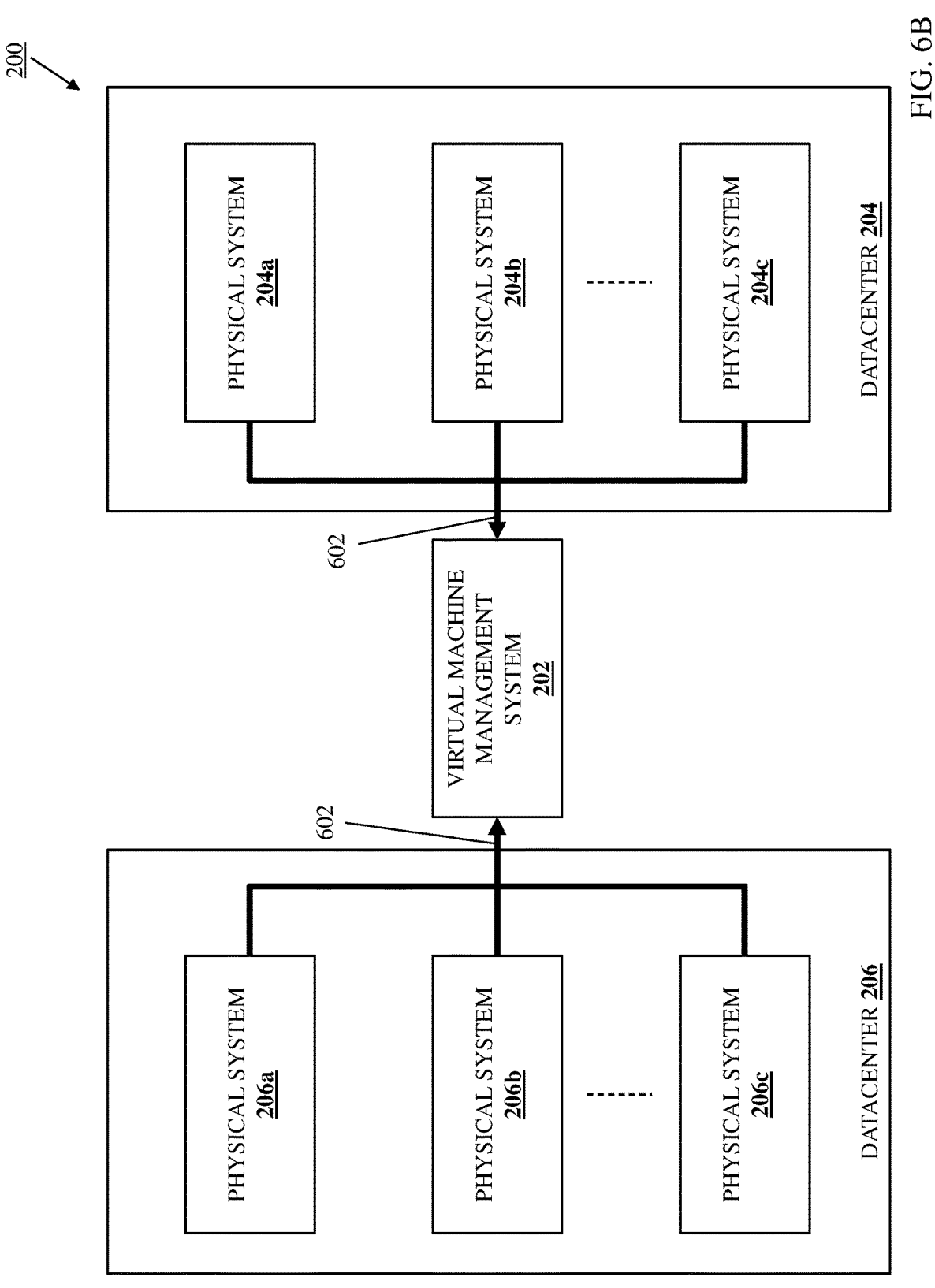
FIG. 6B is a schematic view illustrating an embodiment of the networked system of FIG. 2 operating during the method of FIG. 5.
Figure 6C:
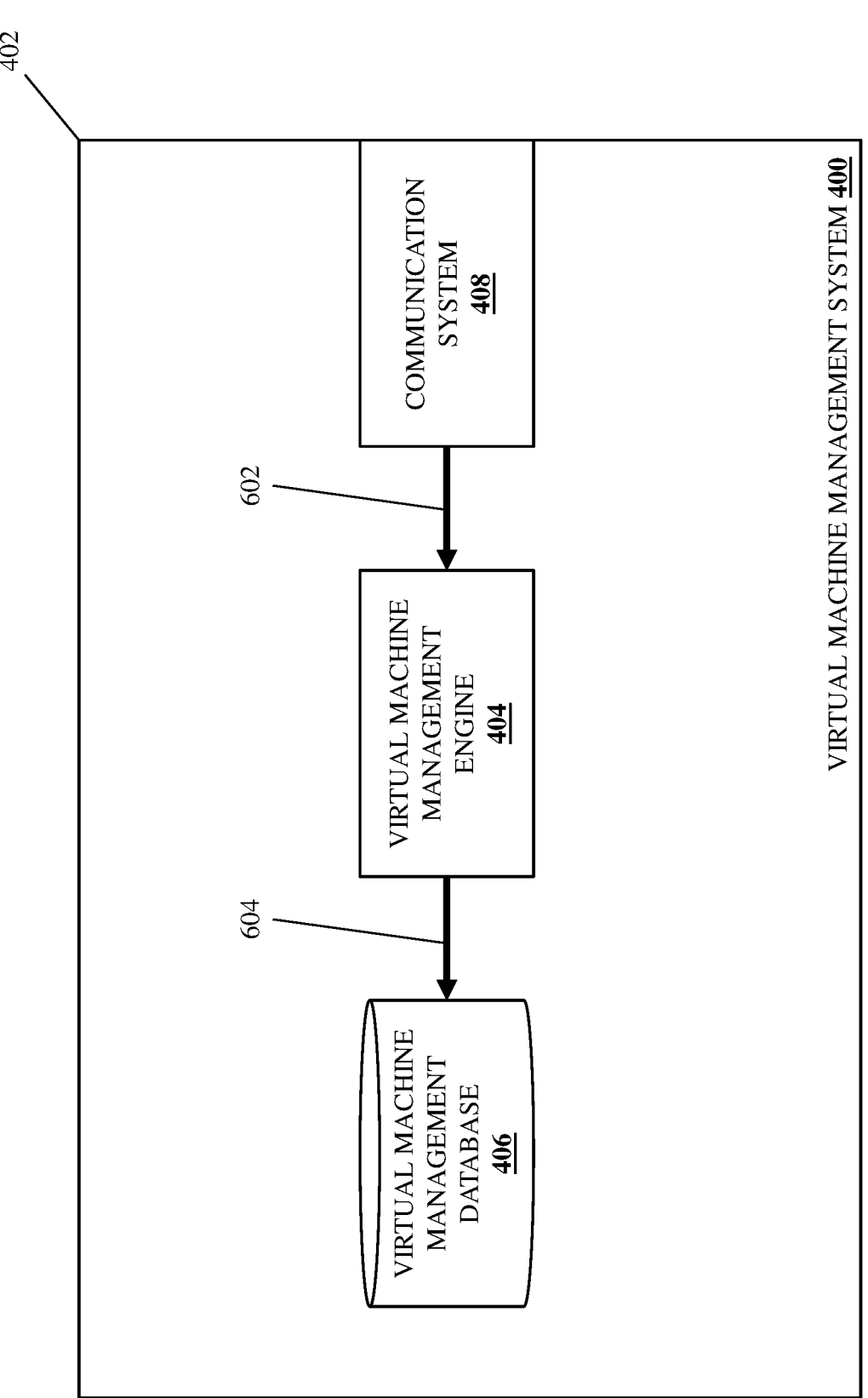
FIG. 6C is a schematic view illustrating an embodiment of the virtual machine management system of FIG. 4 operating during the method of FIG. 5.

For example, with reference to FIGS. 6A, 6B, and 6C, at block 502 the processing subsystem 302 and the memory subsystem 304 in each of the physical systems 204a-204c and 206a-206c may perform resource utilization information transmission operations 600 that may include generating and transmitting to the physical system operation reporting engine 306 any of a variety of resource utilization information (e.g., processing subsystem utilization information from the processing subsystem 302 and memory subsystem utilization information from the memory subsystem 304) that would be apparent to one of skill in the art in possession of the present disclosure. Furthermore, while illustrated and described as the processing subsystem 302 and the memory subsystem 304 "pushing" the resource utilization information to the physical system operation reporting engine 306, one of skill in the art in possession of the present disclosure will appreciate how the physical system operation reporting engine 306 may "pull" the resource utilization from the processing subsystem 302 and the memory subsystem 304 (e.g., via the monitoring of registers or other utilization tracking subsystems in the processing subsystem 302 and the memory subsystem 304 and/or using other resource utilization information retrieval techniques known in the art) while remaining within the scope of the present disclosure as well.

In specific example, the processing subsystem utilization information may identify power consumed by the processing subsystem, load metrics (e.g., average load over a time period), process metrics (e.g., a number of processes running), processing time metrics (e.g., a percentage of processing time spent idle), and/or any other processing subsystem utilization information that would be apparent to one of skill in the art in possession of the present disclosure. In another specific example, the memory subsystem utilization information may identify power consumed by the memory subsystem, total available memory space, amount of used memory, total free memory, memory used by buffers, and/or any other memory subsystem utilization information that would be apparent to one of skill in the art in possession of the present disclosure. Furthermore, while the resource utilization information received at block 502 has been described as including processing subsystem and memory subsystem utilization information, one of skill in the art in possession of the present disclosure will appreciate how other resource utilization information (e.g., networking subsystem utilization, power subsystem utilization, cooling system utilization, etc.) may be received at block 502 while remaining within the scope of the present disclosure.

Referring back to FIGS. 6A and 6B, at block 502 the physical system operation reporting engine 306 in each of the physical systems 204a-204c and 206a-206c may perform resource utilization reporting operations 602 that may include transmitting the resource utilization information received from the processing subsystems 302 and the memory subsystems 304 (as well as other resource subsystems in some embodiments) via its communication system 310 and to the virtual machine management system 202. As such, at block 502 and as illustrated in FIG. 6C, the virtual machine management engine 404 may receive the resource utilization information via its communication system 408 as part of the resource utilization reporting operations 602, and may perform resource utilization information storage operations 604 that may include storing that resource utilization information in the virtual machine management database 406.

As will be appreciated by one of skill in the art in possession of the present disclosure, while block 502 is described as being performed once during each iteration of the method 500 to receive "current" resource utilization information, block 502 may be performed continuously or periodically during any iteration of the method 500. As such, any "current" performance of block 502 of the method 500 may receive "current" resource utilization information, with any "previous" performances of block 502 having received and stored "historical" resource utilization information (e.g., in the virtual machine management database 406, in a database that is accessible via a network by the virtual machine management database 406, etc.) However, while specific examples of the receiving of resource utilization information have been described, one of skill in the art in possession of the present disclosure will appreciate how the resource utilization of the physical systems 204a-204c and 206a-206c may be identified using other techniques that will fall within the scope of the present disclosure as well.

The method 500 then proceeds to block 504 where the virtual machine management system receives current temperature information from the physical systems. As will be appreciated by one of skill in the art in possession of the present disclosure and as discussed in further detail below, the utilization of resources of the processing subsystems 302 and memory subsystems 304 in each physical system 204a-204c and 206a-206c to provide its virtual machines and perform the workloads hosted by those virtual machines will result in a temperature increase in those processing subsystems 302 and memory subsystems 304, as well as temperature increases in the chassis 302 of the physical system 204a-204c and 206a-206c, racks that house those physical system 204a-204c and 206a-206c, and datacenters that include those rack, and those temperatures (as well as ambient temperatures) may be monitored and reported.

Figure 7A:
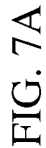
FIG. 7A is a schematic view illustrating an embodiment of the physical system of FIG. 3 operating during the method of FIG. 5.
Figure 7B:
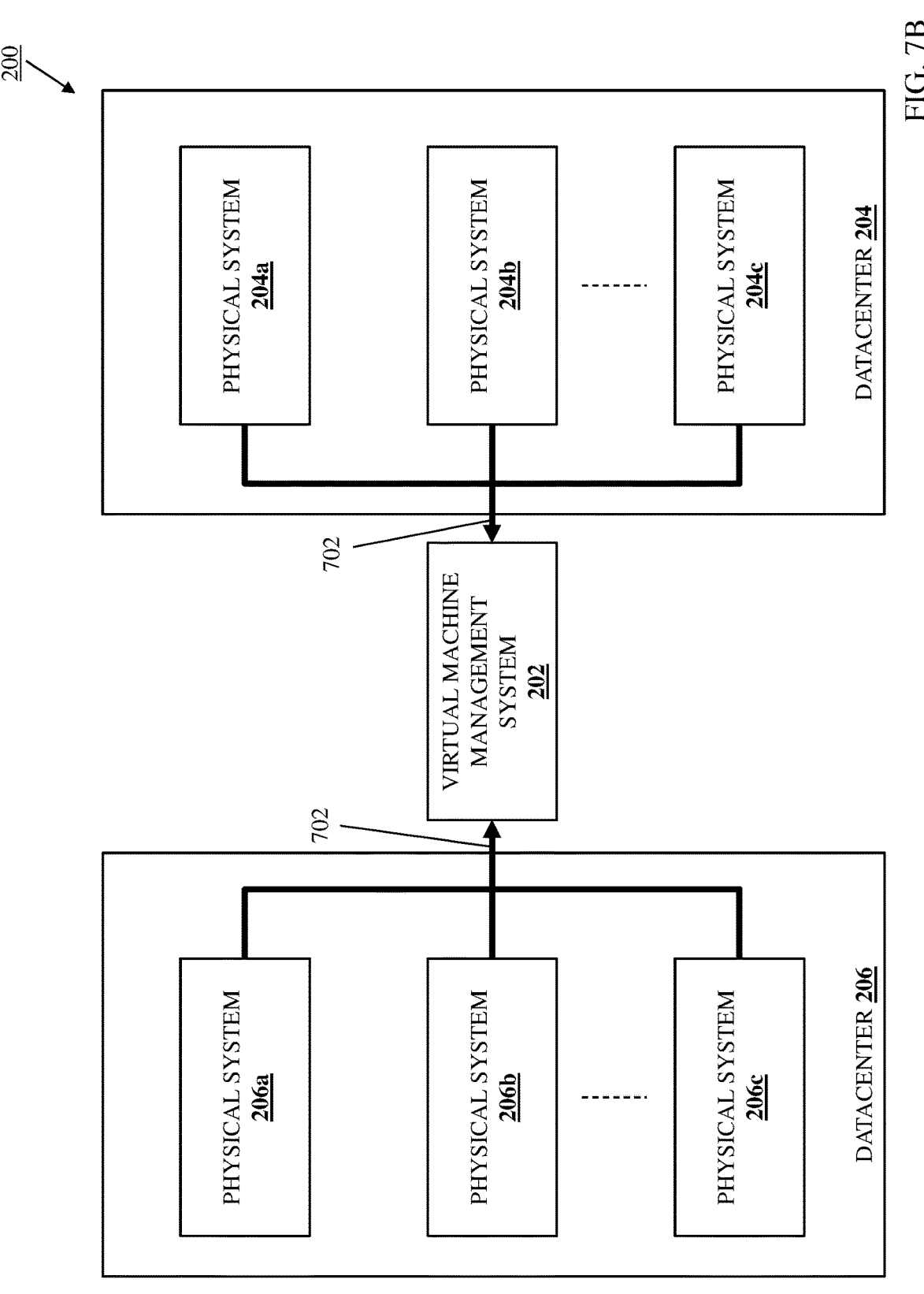
FIG. 7B is a schematic view illustrating an embodiment of the networked system of FIG. 2 operating during the method of FIG. 5.
Figure 7C:
FIG. 7C is a schematic view illustrating an embodiment of the virtual machine management system of FIG. 4 operating during the method of FIG. 5.

For example, with reference to FIGS. 7A, 7B, and 7C, at block 504 the temperature sensor subsystem 308 in each of the physical systems 204a-204c and 206a-206c may perform temperature monitoring operations 700 that may include identifying temperatures generated by the processing subsystem 302 and the memory subsystem 304 in its physical system 300 to its physical system operation reporting engine 306, as well as identifying temperatures at one or more locations in the chassis 302 of its physical system 300 to its physical system operation reporting engine 306, identifying temperatures at one or more locations in a rack that houses its physical system 300 to its physical system operation reporting engine 306, identifying temperatures at one or more locations in the datacenter that includes the rack that houses its physical system 300 to its physical system operation reporting engine 306, and/or identifying ambient temperatures at one or more locations at which the physical systems 300, racks, or datacenters are located to its physical system operation reporting engine 306. Furthermore, while the temperature monitoring operations 700 at block 504 has been described as identifying temperatures generated or influenced by the processing subsystems 302 and memory subsystems 304 to the physical system operation reporting engine 306, one of skill in the art in possession of the present disclosure will appreciate how temperatures generated or influenced by other resources (e.g., networking subsystems, power subsystems, cooling subsystems, etc.) may be identified at block 504 to the physical system operation reporting engine 306 while remaining within the scope of the present disclosure.

Referring back to FIGS. 7A and 7B, at block 504 the physical system operation reporting engine 306 in each of the physical systems 204a-204c and 206a-206c may perform temperature reporting operations 702 that may include transmitting the temperature information received from the temperature sensor subsystem 308 via its communication system 310 and to the virtual machine management system 202. As such, at block 504 and as illustrated in FIG. 7C, the virtual machine management engine 404 may receive the temperature information via its communication system 408 as part of the temperature reporting operations 702, and may perform temperature information storage operations 704 that may include storing that temperature information in the virtual machine management database 406.

As will be appreciated by one of skill in the art in possession of the present disclosure, while block 502 is described as being performed once during each iteration of the method 500 to receive "current" temperature information, block 504 may be performed continuously or periodically during any iteration of the method 500. As such, any "current" performance of block 504 of the method 500 may receive "current" temperature information, with any "previous" performances of block 504 having received and stored "historical" temperature information (e.g., in the virtual machine management database 406, in a database that is accessible via a network by the virtual machine management database 406, etc.) However, while specific examples of the receiving of temperature information have been described, one of skill in the art in possession of the present disclosure will appreciate how temperatures generated or influenced by the physical systems 204a-204c and 206a-206c (as well as ambient temperatures) may be identified using other techniques that will fall within the scope of the present disclosure as well.

Figure 8:
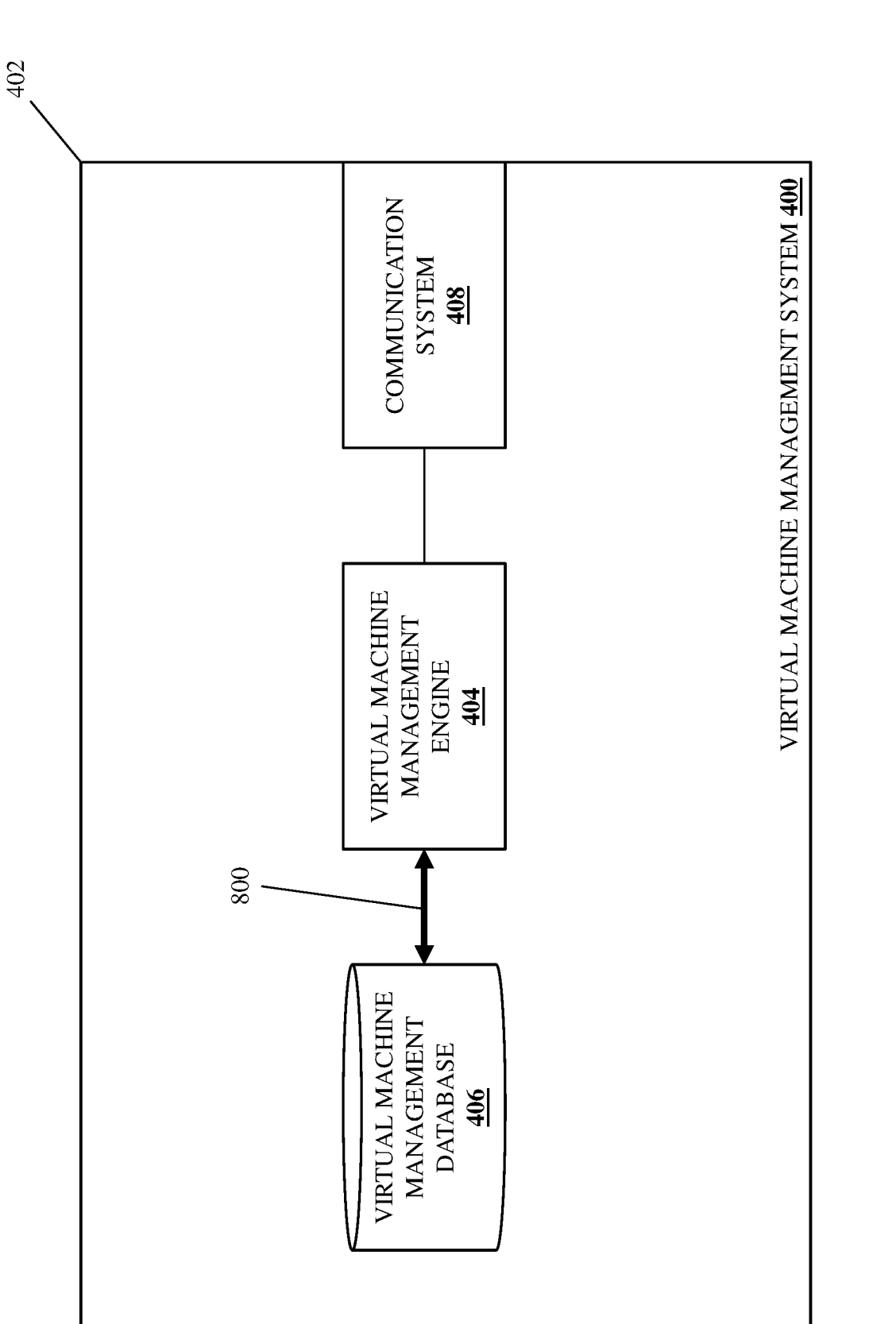
FIG. 8 is a schematic view illustrating an embodiment of the virtual machine management system of FIG. 4 operating during the method of FIG. 5.

The method 500 then proceeds to block 506 where the virtual machine management system predicts a predicted temperature associated with at least one physical system based on the current resource utilization information and the current temperature information. With reference to FIG. 8, in an embodiment of block 506, the virtual machine management engine 404 in the virtual machine management system 202/400 may perform temperature prediction operations 800 that may include using the current resource utilization information and current temperature information received at blocks 402 and 404 to generate predicted temperatures that are associated with the physical systems 204a-204c and 206a-206c.

For example, the virtual machine management engine 404 in the virtual machine management system 202/400 may include an Artificial Intelligence/Machine Learning (AI/ML) sub-engine or other subsystem that includes an temperature prediction model that was trained using times-series data provided by the historical resource utilization information and/or historical temperature information discussed above that was previously received from each of the plurality of physical systems 204a-204c and 206a-206c, and at block 506 that AI/ML subsystem may use that temperature prediction model to generate a predicted temperature associated with one or more of the physical systems 204a-204a and 206a-206c. As will be appreciated by one of skill in the art in possession of the present disclosure and as discussed in further detail below, predicted temperatures may be generated for each of the physical systems 204a-204a and 206a-206c and may predict how the temperatures of those physical systems 204a-204a and 206a-206c will progress over time, predicted temperatures may be generated for a rack that houses a subset of the physical systems 204a-204a and 206a-206c and may predict how temperatures of that rack will progress over time, and/or predicted temperatures may be generated for a datacenter that includes racks that house subsets of the physical systems 204a-204a and 206a-206c and may predict how temperatures of that datacenter will progress over time. Furthermore, while a few specific predicted temperatures are described herein, one of skill in the art in possession of the present disclosure will appreciate how other predicted temperatures will fall within the scope of the present disclosure as well.

To provide a specific example, one of skill in the art in possession of the present disclosure will appreciate how the AI/ML subsystem in the virtual machine management engine 404 in the virtual machine management system 202/400 may receive the current resource utilization information and the current temperature information from physical system(s) that identifies their current state(s) and, based on the current utilization of the physical system(s) (which may be considered proportional to the allocations of virtual machines to those physical system(s)), may predict how the current temperature(s) identified in the current temperature information will progress over time. Furthermore, in some embodiments, the AI/ML subsystem in the virtual machine management engine 404 may consider current and/or historical cooling capacities, current and/or historical ambient temperatures, and/or other information associated with physical systems, racks, and/or datacenters in generating predicted temperatures and/or otherwise determining how temperatures will progress at block 506. However, while specific examples of the prediction of temperatures associated with physical systems have been described, one of skill in the art in possession of the present disclosure will appreciate how temperatures associated with physical systems may be predicted using other techniques that will fall within the scope of the present disclosure as well.

The method 500 then proceeds to decision block 508 where it is determined whether a predicted temperature is below a temperature threshold. In an embodiment, at decision block 508, the virtual machine management engine 404 in the virtual machine management system 202/400 may determine whether the predicted temperature generated at block 506 is below a threshold temperature. In the embodiment of decision block 508 described below, a specific example of the determination of whether a predicted temperature associated with physical system(s) is below a temperature threshold is provided, with that predicted temperature having been generated for a rack housing a plurality of physical systems. However, one of skill in the art in possession of the present disclosure will appreciate how the techniques described below may be applied to determining whether a predicted temperature generated for a particular physical system is below a temperature threshold, or determining whether a predicted temperature generated for a datacenter including racks housing a plurality of physical systems is below a temperature threshold, while remaining within the scope of the present disclosure.

Figure 9:
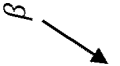
FIG. 9 is a chart illustrating an embodiment of a physical machine/virtual machine allocation matrix that may be used during the method of FIG. 5.
Figure 9:
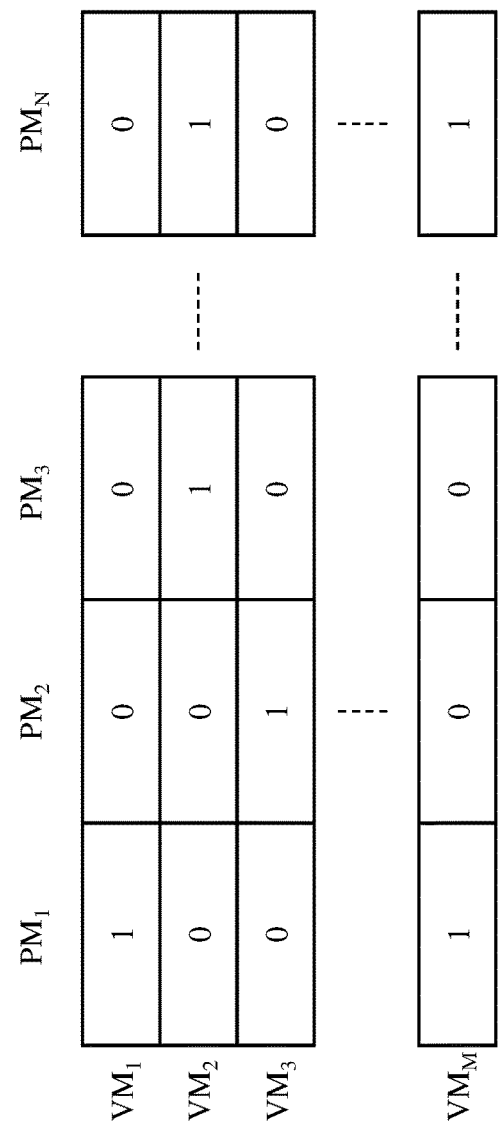

For this example, with reference to FIG. 9, consider a matrix β of size [n×m] that identifies whether a virtual machine (VM) is hosted or otherwise provided on a physical system/Physical Machine (PM). As will be appreciated by one of skill in the art in possession of the present disclosure, in the matrix β, $\beta_{ij}$=1 if $VM_i$ is hosted on $PM_j$, while $\beta_{ij}$=0 if $VM_i$ is not hosted on $PM_j$. In the following equations, let $PM_j^{CPU}$ identify a processing system utilization of the processing system in a PM by all of the VMs provided on the PM, $PM_j^{MEM}$ identify a memory system utilization of the memory system in a PM by all of the VMs provided on the PM, and $PM_j^{TEMP}$ identify a predicted temperature of a PM in a next time instance that is attributed to all of the VMs provided on that PM (e.g., which may be provided by any temperature or combinations of temperatures predicted for that PM in the next time instance using, for example, the AI/ML techniques discussed below). Similarly, in the following equations, let $VM_j^{CPU}$ identify a processing system utilization of the processing system in a PM by a particular $VM_j$ provided on that PM, $VM_j^{MEM}$ identify a memory system utilization of the memory system in a PM by a particular $VM_j$ provided on that PM, and $VM_j^{TEMP}$ identify a predicted temperature of a PM in a next time instance that is attributed to a particular $VM_j$ provided on that PM (e.g., which may be provided by any temperature or combinations of temperatures predicted for that PM in the next time instance using, for example, the AI/ML techniques discussed below).

In an embodiment, the processing system utilization $(RU_j^{CPU})$ of each PM may be determined by the following equation:

$$RU_j^{CPU} = \frac{\sum_{i=1}^{n} \beta_{ij} \times VMiC^{PU}}{PM_j^{CPU}}$$

Furthermore, the memory system utilization $(RU_j^{MEM})$ of each PM may be determined by the following equation:

$$RU_j^{MEM} = \frac{\sum_{i=1}^{n} \beta_{ij} \times VM_i^{MEM}}{PM_j^{MEM}}$$

Further still, a predicted temperature of a rack that includes a plurality of the PMs $(RU_j^{TEMP})$ may be determined by the following equation:

$$RU_i^{TEMP} = \sum_{i=1}^{n} PM_i^{TEMP}(t + 1) + Amb_{TEMP}$$

where i=a number of PMs in the rack, $PM_i^{TEMP}$ (t+1)=a predicted temperature for a PM at a time t+1 that may be determined by the AI/ML subsystem using the temperature prediction model discussed above, and $Amb_{TEMP}$ is an ambient temperature associated with the rack (e.g., an ambient temperature that may be measured anywhere adjacent to and/or outside of the rack).

As such, a threshold temperature for a rack may be defined by a network administrator or other user, a physical system manufacturer, a rack manufacturer, and/or any other entity that would be apparent to one of skill in the art in possession of the present disclosure, and the virtual machine management engine 404 in the virtual machine management system 202/400 may compare the predicted temperature of the rack $(RU_j^{TEMP})$ to that threshold temperature in order to determine whether it is below that threshold temperature. However, while predicted temperature of a rack is illustrated and described, one of skill in the art in possession of the present disclosure will appreciate how predicted temperature of a datacenter may be determined in a similar manner.

In some embodiments, an average resource utilization of the PMs in the rack ($RU_{RACK}$) may be determined by the following equation:

$$RU_{RACK} = \frac{\sum_{j=1}^{m} RU_j^{CPU} + \sum_{j=1}^{m} RU_j^{MEM} + RU_j^{TEMP}}{|R| \times \sum_{j=1}^{m} \alpha_j}$$

where R identifies the number of resources being considered in each PM (e.g., |R|=3 if a processing system, memory system, and temperature in the PMs is being considered), $\alpha_j$ identifies the state of a $PM_j$, with $\alpha_j$ equaling 1 if a $PM_j$ is active (i.e., one or more VMs are being provided on that $PM_j$), and with $\alpha_j$ equaling 0 if a $PM_j$ is inactive (i.e., no VMs are being provided on that $PM_j$ or that $PM_j$ is otherwise not operating). As discussed below, the average resource utilization of the rack ($RU_{RACK}$) may be used to determine whether PMs in that rack are available to host other VMs, or whether VMs should be migrated from those PMs. However, while average resource utilization of a rack is illustrated and described, one of skill in the art in possession of the present disclosure will appreciate how average resource utilization of a datacenter may be determined in a similar manner.

If, at decision block 508, it is determined that a predicted temperature is not below the temperature threshold, the method 500 proceeds to block 510 where the virtual machine management system migrates one or more virtual machines from the physical system associated with the predicted temperature that is above the temperature threshold. In an embodiment, at block 510 and in response to determining that the predicted temperature generated at block 506 is above the threshold temperature, the virtual machine management engine 404 in the virtual machine management system 202/400 may migrate virtual machines from physical systems associated with that predicted temperature. Continuing with the example above in which the predicted temperature was generated for the rack including a subset of the physical systems 204a-204c and 206a-206c, the virtual machine management engine 404 may migrate virtual machine(s) provided by one or more of the physical systems housed in that rack to physical systems housed in other racks that have predicted temperatures below the temperature threshold.

In one specific example, the migration of virtual machines from physical systems housed in a rack may include determining a number of virtual machines that must be migrated from the physical systems in that rack in order to cause the predicted temperature of that rack ($RU_j^{TEMP}$) to drop below the threshold temperature, and then migrating that number of virtual machines from the physical system in that rack to physical systems in other rack(s) that have predicted temperature(s) below the temperature threshold. In another specific example, the migration of virtual machines from physical systems housed in a rack may include identifying physical systems in that rack that have relatively high processing system utilizations and/or memory system utilizations, and then migrating virtual machines from those physical system in that rack to physical systems in other rack(s) that have relatively low processing system utilizations and/or memory system utilizations. In another specific example, the migration of virtual machines from physical systems housed in a rack may include determining a number of virtual machines that must be migrated from the physical systems in that rack in order to cause the average resource utilization of the physical systems in that rack ($RU_{RACK}$) to drop below a threshold utilization, and then migrating that number of virtual machines from the physical system in that rack to physical systems in other rack(s) that have relatively lower average resource utilizations. However, while a few specific examples of virtual machine migration between racks have been described, one of skill in the art in possession of the present disclosure will appreciate how virtual machine migration may be performed in other manners while remaining within the scope of the present disclosure as well.

For example, consider a situation in which the datacenter 204 is consuming relatively large amounts of power and utilizing a maximum amount of cooling, and the physical system 204a in the datacenter 204 is providing relatively highly loaded virtual machines. Furthermore, the datacenter 206 may be consuming relatively less power than the datacenter 204 and thus may be utilizing relatively less cooling than the datacenter 204, with the physical system 206a providing relatively low load virtual machines. At block 510 of the method 500, virtual machines provided on the physical system 204a included in the datacenter 204 may be migrated to the physical system 206, reducing the power consumption and cooling requirements of the datacenter 204 to more optimal levels.

If at decision block 508, it is determined that a predicted temperature is below the temperature threshold, the method 500 proceeds to decision block 512 where it is determined whether there are one or more virtual machines to allocate. In an embodiment, at decision block 512, the virtual machine management engine 404 in the virtual machine management system 202/400 may determine whether it has virtual machines to allocate to physical systems in the networked system 200. For example, the virtual machine management system 202 may periodically receive requests to perform workloads, and thus may periodically allocate virtual machines on physical systems in the networked system 200 for performing those workloads, and thus at block 512 a determination may be made as to whether such virtual machines should be allocated to the physical machines in the networked system 200.

If, at decision block 512, it is determined that there are no virtual machines to allocate, the method 500 returns to block 502. As such, the method 500 may loop such that that virtual machine management system receives current resource utilization information and current temperature information and predicts predicted temperatures as long as those predicted temperatures are below a temperature thresholds and there are no virtual machines to allocate. If, at decision block 512, it is determined that there are virtual machines to allocate, the method 500 proceeds to block 514 where the virtual machine management system provides one or more virtual machines on the physical system associated with the predicted temperature that is below the temperature threshold. In an embodiment, at block 514 and in response to determining that the predicted temperature generated at block 506 is below the threshold temperature, the virtual machine management engine 404 in the virtual machine management system 202/400 may allocate virtual machines to physical systems associated with that predicted temperature. Continuing with the example above in which the predicted temperature was generated for the rack including a subset of the physical systems 204a-204c and 206a-206c, the virtual machine management engine 404 may allocate virtual machine(s) to one or more of the physical systems housed in that rack.

In one specific example, the allocation of virtual machines to physical systems housed in a rack may include determining a number of virtual machines that may be allocated to the physical systems in that rack without causing the predicted temperature of that rack ($RU_j^{TEMP}$) to rise above the threshold temperature, and then allocating that number of virtual machines to the physical systems in that rack. In another specific example, the allocation of virtual machines to physical systems housed in a rack may include identifying physical systems in that rack that have relatively low processing system utilizations and/or memory system utilizations, and then allocating virtual machines to those physical systems in that rack. In another specific example, the allocation of virtual machines to physical systems housed in a rack may include determining a number of virtual machines that may be allocated to the physical systems in that rack without causing the average resource utilization of the physical systems in that rack ($RU_{RACK}$) to rise above a threshold utilization, and then allocating that number of virtual machines to the physical systems in that rack. However, while a few specific examples of virtual machine allocation have been described, one of skill in the art in possession of the present disclosure will appreciate how virtual machine allocation may be performed in other manners while remaining within the scope of the present disclosure as well. The method 500 then returns to block 502.

Thus, systems and methods have been described that provide for management of virtual machines provided on (or to-be provided on) physical systems by predicting whether temperatures that those physical systems will experience based on their current temperatures and resource utilization will exceed temperature thresholds. For example, a networked system may include a virtual machine management system coupled to physical systems. The virtual machine management system receives current resource utilization information and current temperature information from each of the physical systems, and uses the current resource utilization information and the current temperature information to predict a predicted temperature associated with at least one of the physical systems. The virtual machine management system then determines whether a first predicted temperature associated with a first physical system is below a temperature threshold. In response to determining that the first predicted temperature is below the threshold temperature, the virtual machine management system provides virtual machine(s) on the first physical system. In response to determining that the first predicted temperature is not below the threshold temperature, the virtual machine management system migrates virtual machine(s) being provided on the first physical system to a second physical system. As such, virtual machines may be provided on or moved between physical systems proactively to ensure those physical systems remain below temperature thresholds, thus reducing or eliminating the inefficient provisioning of virtual machines that may subsequently require virtual machine migration (e.g., due to temperature issues in the physical system on which those virtual machines were provisioned).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:
a plurality of physical systems that each include a respective chassis; and
a virtual machine management system that is coupled to the plurality of physical systems and that is configured to:
receive current resource utilization information from each of the plurality of physical systems that identifies:
a current processing subsystem utilization of a processing subsystem included in the respective chassis of that physical system; and
a current memory subsystem utilization of a memory subsystem included in the respective chassis of that physical system;
receive current temperature information from each of the plurality of physical systems that identifies:
a current temperature of the processing subsystem included in the respective chassis of that physical system;
a current temperature of the memory subsystem included in the respective chassis of that physical system;
a current temperature of at least one location in the respective chassis of that physical system;
a current temperature of at least one location in a rack in which that physical system is located; and
a current temperature of at least one location in a datacenter in which that physical system is located;
predict, using the current resource utilization information and the current temperature information, a predicted temperature associated with at least one of the plurality of physical systems;
determine whether a first predicted temperature associated with a first physical system that is included in the plurality of physical systems is below a temperature threshold;
provide, in response to determining that the first predicted temperature is below the threshold temperature, at least one virtual machine on the first physical system; and
migrate, in response to determining that the first predicted temperature is not below the threshold temperature, at least one virtual machine that is being provided on the first physical system to a second physical system that is included in the plurality of physical systems.

2. The system of claim 1, wherein the first predicted temperature associated with the first physical system is a temperature predicted to be experienced by the first physical system.

3. The system of claim 1, wherein the first predicted temperature associated with the first physical system is a temperature predicted to be experienced by a first rack that includes the first physical system and the second physical systems.

4. The system of claim 1, wherein the first predicted temperature associated with the first physical system is a temperature predicted to be experienced by a first datacenter that includes the first physical system and the second physical systems.

5. The system of claim 1, wherein the first predicted temperature associated with the first physical system is a temperature predicted to be experienced by a first rack that includes the first physical system and that does not include the second physical system.

6. The system of claim 1, wherein the predicting the predicted temperature associated with the at least one of the plurality of physical systems is performed by an Artificial Intelligence/Machine Learning subsystem that was trained using historical resource utilization information and historical temperature information that was previously received from each of the plurality of physical systems.

7. An Information Handling System (IHS), comprising:
a processing system; and
a memory system that is coupled to the processing system and that includes instructions that, when executed by the processing system, cause the processing system to provide a virtual machine management engine that is configured to:
  receive current resource utilization information from each of a plurality of physical systems that identifies:
    a current processing subsystem utilization of a processing subsystem included in a respective chassis of that physical system; and
    a current memory subsystem utilization of a memory subsystem included in a respective chassis of that physical system;
  receive current temperature information from each of the plurality of physical systems that identifies:
    a current temperature of the processing subsystem included in the respective chassis of that physical system;
    a current temperature of the memory subsystem included in the respective chassis of that physical system;
    a current temperature of at least one location in the respective chassis of that physical system;
    a current temperature of at least one location in a rack in which that physical system is located; and
    a current temperature of at least one location in a datacenter in which that physical system is located;
  predict, using the current resource utilization information and the current temperature information, a predicted temperature associated with at least one of the plurality of physical systems;
  determine whether a first predicted temperature associated with a first physical system that is included in the plurality of physical systems is below a temperature threshold and;
  provide, in response to determining that the first predicted temperature is below the threshold temperature, at least one virtual machine on the first physical system; and
  migrate, in response to determining that the first predicted temperature is not below the threshold temperature, at least one virtual machine that is being provided on the first physical system to a second physical system that is included in the plurality of physical systems.

8. The IHS of claim 7, wherein the first predicted temperature associated with the first physical system is a temperature predicted to be experienced by the first physical system.

9. The IHS of claim 7, wherein the first predicted temperature associated with the first physical system is a temperature predicted to be experienced by a first rack that includes the first physical system and the second physical systems.

10. The IHS of claim 7, wherein the first predicted temperature associated with the first physical system is a temperature predicted to be experienced by a first datacenter that includes the first physical system and the second physical system.

11. The IHS of claim 7, wherein the first predicted temperature associated with the first physical system is a temperature predicted to be experienced by a first rack that includes the first physical system and that does not include the second physical system.

12. The IHS of claim 7, wherein the predicting the predicted temperature associated with the at least one of the plurality of physical systems is performed by an Artificial Intelligence/Machine Learning subsystem that was trained using historical resource utilization information and historical temperature information that was previously received from each of the plurality of physical systems.

13. The IHS of claim 7, wherein the migrating the at least one virtual machine that is being provided on the first physical system to the second physical system includes migrating the at least one virtual machine, which is being provided on the first physical system in a first datacenter that is consuming a first amount of power, to the second physical system in a second datacenter that is consuming a second amount of power that is less than the first amount of power.

14. A method for managing virtual machines based on predicted temperatures, comprising:
  receiving, by a virtual machine management system, current resource utilization information from each of a plurality of physical systems that identifies:
    a current processing subsystem utilization of a processing subsystem included in a respective chassis of that physical system; and
    a current memory subsystem utilization of a memory subsystem included in a respective chassis of that physical system;
  receiving, by the virtual machine management system, current temperature information from each of the plurality of physical systems that identifies:
    a current temperature of the processing subsystem included in the respective chassis of that physical system;
    a current temperature of the memory subsystem included in the respective chassis of that physical system;
    a current temperature of at least one location in the respective chassis of that physical system;
    a current temperature of at least one location in a rack in which that physical system is located; and
    a current temperature of at least one location in a datacenter in which that physical system is located;
  predicting, by the virtual machine management system using the current resource utilization information and the current temperature information, a predicted temperature associated with at least one of the plurality of physical systems;
  determining, by the virtual machine management system, whether a first predicted temperature associated with a first physical system that is included in the plurality of physical systems is below a temperature threshold;
  providing, by the virtual machine management system in response to determining that the first predicted temperature is below the threshold temperature, at least one virtual machine on the first physical system; and
  migrating, by the virtual machine management system in response to determining that the first predicted temperature is not below the threshold temperature, at least one virtual machine that is being provided on the first physical system to a second physical system that is included in the plurality of physical systems.

15. The method of claim 14, wherein the first predicted temperature associated with the first physical system is a temperature predicted to be experienced by the first physical system.

16. The method of claim 14, wherein the first predicted temperature associated with the first physical system is a temperature predicted to be experienced by a first rack that includes the first physical system and the second physical systems.

17. The method of claim 14, wherein the first predicted temperature associated with the first physical system is a temperature predicted to be experienced by a first datacenter that includes the first physical system and the second physical systems.

18. The method of claim 14, wherein the first predicted temperature associated with the first physical system is a temperature predicted to be experienced by a first rack that includes the first physical system and that does not include the second physical system.

19. The method of claim 14, wherein the predicting the predicted temperature associated with the at least one of the plurality of physical systems is performed by an Artificial Intelligence/Machine Learning subsystem that was trained using historical resource utilization information and historical temperature information that was previously received from each of the plurality of physical systems.

20. The method of claim 14, wherein the migrating the at least one virtual machine that is being provided on the first physical system to the second physical system includes migrating the at least one virtual machine, which is being provided on the first physical system in a first datacenter that is consuming a first amount of power, to the second physical system in a second datacenter that is consuming a second amount of power that is less than the first amount of power.

\* \* \* \* \*